Oct. 31, 1967 R. F. COTTRELL 3,349,561
QUICK-RELEASE CLOSURE FOR AUXILIARY PORT IN ROCKET MOTOR
Filed June 11, 1962 2 Sheets-Sheet 1

INVENTOR.
RICHARD F. COTTRELL

BY

ATTORNEY

Oct. 31, 1967     R. F. COTTRELL     3,349,561
QUICK-RELEASE CLOSURE FOR AUXILIARY PORT IN ROCKET MOTOR
Filed June 11, 1962     2 Sheets-Sheet 2

INVENTOR.
RICHARD F. COTTRELL
BY
*Robert C. Evans*
ATTORNEY

United States Patent Office 3,349,561
Patented Oct. 31, 1967

3,349,561
QUICK-RELEASE CLOSURE FOR AUXILIARY
PORT IN ROCKET MOTOR
Richard F. Cottrell, Carmichael, Calif., assignor to
Aerojet-General Corporation, Azusa, Calif., a corporation of Ohio
Filed June 11, 1962, Ser. No. 202,356
3 Claims. (Cl. 60—229)

This invention relates to a removable closure, and more particularly, to a mechanical release for a closure on an auxiliary port in a rocket motor engine.

Thrust termination, thrust modification, or thrust reversal, in a solid propellant rocket motor, may be accomplished through the introduction of appropriately directed thrust vectors. One way to do this is by designing the rocket motor housing with an adequate number of auxiliary ports which are normally sealed off until such time as the thrust changes are desired.

The devices for opening this auxiliary ports must satisfy a number of rigid requirements. For one thing, the systems must lend themselves to simultaneous operation in order to prevent the introduction of undesired thrust vectors which could occur if the auxiliary ports were not opened simultaneously. In addition, it is extremely important that the auxiliary ports open completely without the possibility of residual fragments partially blocking the openings. This, too, is important, because the presence of any fragments in the ports after they have been opened, would unpredictably cause thrust variations in the rocket.

What is needed, therefore, and comprises a principal object of this invention, is a removable closure for an auxiliary port in a rocket motor which lends itself to simultaneous operation and which opens a port cleanly and with a high degree of reliability.

The invention in its broadest aspect comprises designing a closure for an auxiliary port in a rocket motor housing. The closure is held in position in the port by means of a plurality of retaining members connected between a retaining ring on the rocket motor housing and the closure. A gas generating squib is associated with a shear pin in the retaining mechanism in such a way that when the gas generating squib is ignited, the resultant gas pressure breaks the shear pin and simultaneously blows the retaining members away from the closure plate is free to fall or to be blown from the auxiliary port in the rocket motor housing.

Figure 1:
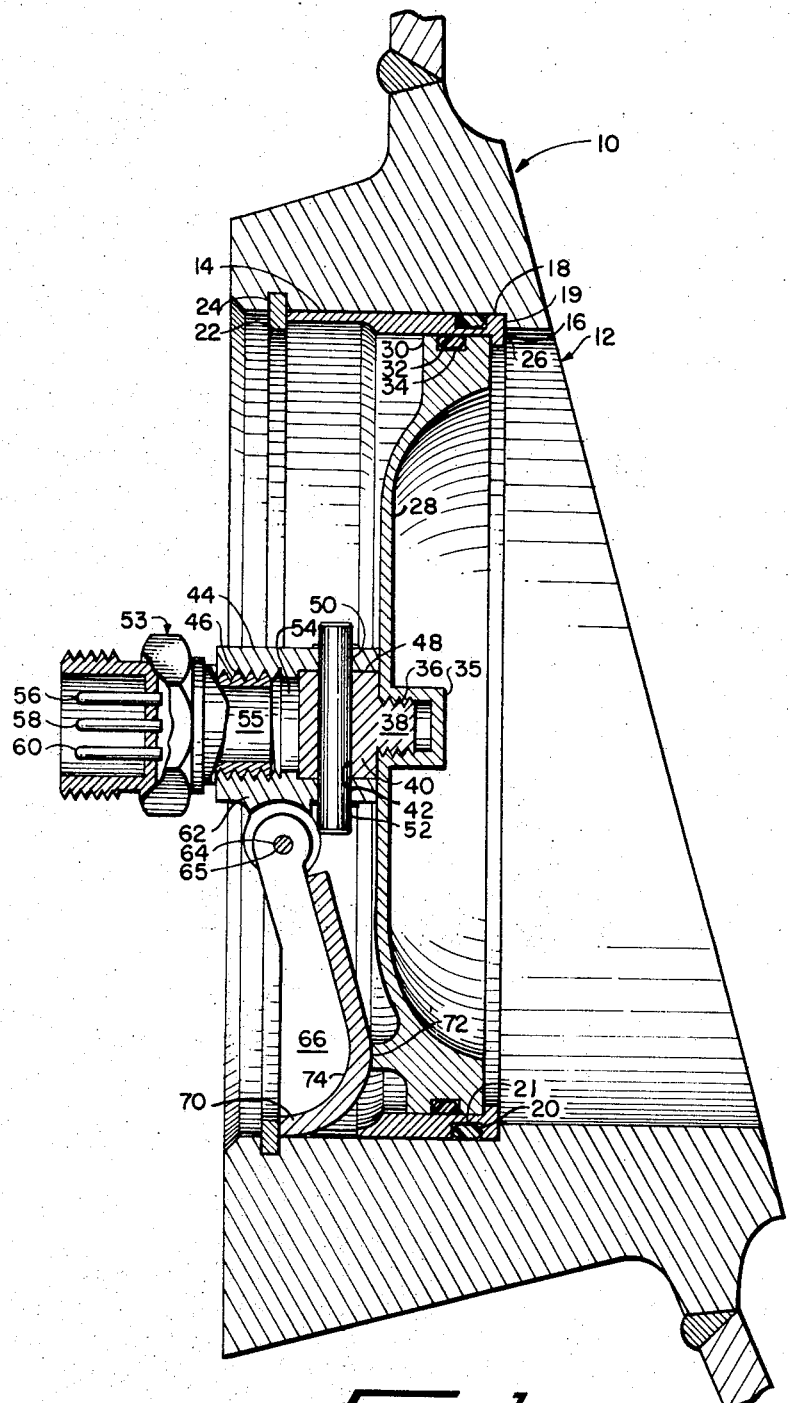
Figure 2:
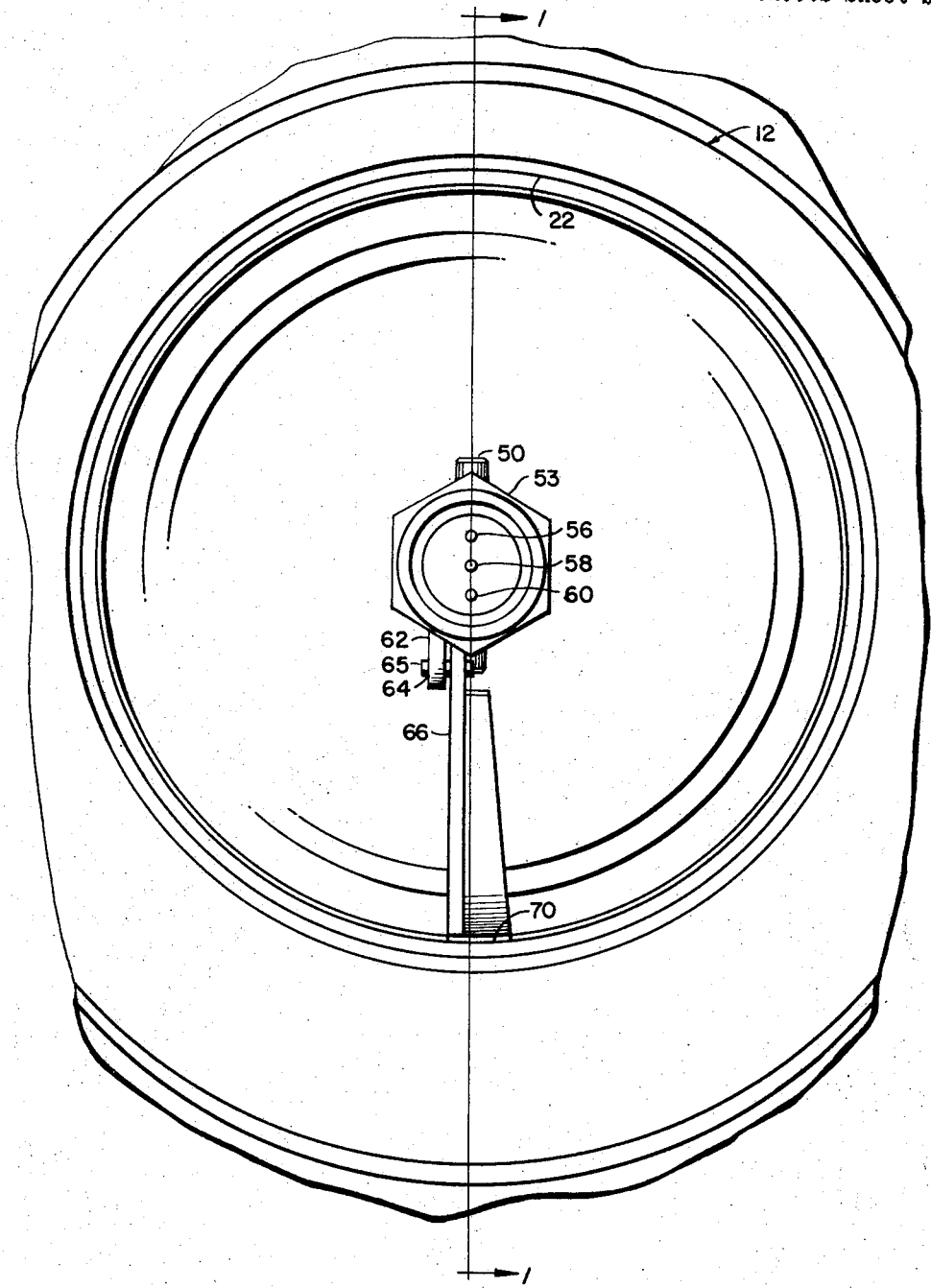

This and other objects of this invention will become more apparent when understood in the light of the accompanying drawings and specification wherein:

FIGURE 1 is a cross-sectional view of a portion of a rocket motor housing showing the closure plate and retaining members in position in the auxiliary port; and FIGURE 2 is a front elevational view of a closure plate shown in FIG. 1.

Referring now to FIGURE 1 of the drawing, a portion of a rocket motor housing, indicated generally by the reference numeral 10 is provided with at least one auxiliary port 12. The auxiliary port 12 is provided with a counterbore 14 defining thereby a shoulder or flange 16. An adapter ring 18 is mounted inside the auxiliary port with an end portion 19 bearing against shoulder 16 as shown in the drawing. To prevent leakage from the high temperature combustion gases inside the rocket motor, past the adapter ring, a sealing ring 20 is mounted in an annular groove 21 formed in the adapter ring 18 in a manner well-known in the art. In addition, the adapter ring is maintained in position against shoulder 16 by means of a retainer ring 22. As seen, the retainer ring is mounted in a groove 24 in the housing 10 which communicates with the counterbore 14. The adapter ring 18 is itself provided with a shoulder or inwardly directed flange portion 26.

A generally dish-shaped closure plate 28 is mounted inside the auxiliary port 12 with its peripheral portion 30 bearing against the shoulder or inwardly directed flange portion 26. The closure member 28 is provided with a groove 32 at its periphery and an O-ring 32 is mounted in the groove 34 to prevent leakage of exhaust gases between the adapter ring 18 and the rim of the closure plate 28.

The closure plate 28 is provided with a centrally located inwardly projecting boss 35. This boss is provided with internal threads 36 for receiving the threaded boss 38 on a mounting stud 40. The mounting stud 40 is provided with a bore 42 extending therethrough in a direction transverse to the axis of the mounting stud. With this arrangement, the mounting stud 40 is threadably secured to the closure plate 28.

An initiator housing 44 is provided. This housing is generally cylindrical in shape and is provided with an internally threaded end portion 46 and a smooth bore portion 48. The internal dimensions of the smooth bore portion 48 are such that the housing 44 can smoothly fit over the smooth surface of the mounting stud 40. The initiator housing 44 also is provided with a bore 50 extending therethrough in a direction transverse to and intersecting the axis of the housing.

The dimensions of the bore 50 are such that they are generally equal to the dimensions of the bore 42 extending through the mounting stud 40. A shear pin 52 is provided for insertion into bores 50 and 42, whereby the initiator housing 44 is secured to the mounting stud 40.

An externally threaded cartridge holding bolt 53 is in threaded engagement with the internally threaded end portion 46 of the initiator housing 44. This closes off the threaded end portion of the housing 44 and defines a closed chamber 54 therein. The cartridge 55 mounted in the cartridge holding bolt 53 is preferably of the gas generating type and is mounted for electrical ignition through leads 56, 58, and 60, in a manner well-known in the art.

Initiator housing 44 is also provided with an integrally formed radially and axially extending flange member 62. The flange member 62 is provided with a pivot pin receiving opening 64 extending therethrough. A retaining finger 66 is pivotally connected to the flange member 62 by means of a pivot pin 65 in a bore extending through the inner end of the retaining finger 66 and through opening 64 (see FIGURE 2). The opposite end 70 of the retaining finger 66 engages the retaining ring 22.

Inward pivoting of the retaining finger 66 is prevented by means of an abutment 72 integrally formed near the rim of the closure plate 28. As best seen in FIGURE 1, this projection or boss 72 engages an arcuate portion 74 of the retaining finger.

When the gas generating squib 55 inside the squib holding bolt 53 is ignited, the increase in gas pressure in the chamber 54 is sufficient to cause a fracture of the shear pin 52. When shear pin 52 breaks, the gas pressure inside the cavity 54 further acts on the initiator housing 44, causing it to move away from the mounting stud 40. This movement is transmitted to retaining finger 66 causing it to pivot sufficiently until its extreme end 70 can clear the retaining ring 22, whereupon the residual gas pressure inside the chamber 54 is sufficient to force all the retaining elements away from the closure plate 28. When this happens, there are no forces or retaining elements secured to the closure plate 28, so even a slight differential pressure between the interior of the rocket motor housing 10 and the external pressure is sufficient to force the closure plate 28 out of the auxiliary port 12 so that the auxiliary port 12 will completely open.

With this arrangement, any number of auxiliary ports can be opened simultaneously by electrically actuating all the gas generating squibs in the squib retaining plugs 53 together. Consequently, any number of auxiliary ports can be simultaneously opened to reverse, modify, or cut off the thrust from the rocket motor.

It is to be understood that the form of the invention herewith shown and described is to be taken as a preferred example of the same, and that various changes in the shape, size, and arrangement of the parts may be resorted to without departing from the spirit of this invention or the scope of the claims.

I claim:
1. In a rocket motor, a housing, said housing having at least one auxiliary port formed therein, a closure plate mounted in said auxiliary port in a port closed position, a mounting stud mounted on said closure plate, retaining means connected between said rocket motor housing and said stud for holding the closure plate in a port closed position against the pressure inside the housing, said retaining means including an initiator housing connected to said mounting stud through a shear pin, gas generating means associated with said initiator housing and causing an increased gas pressure inside the initiator housing in response to the ignition thereof, the increased gas pressure fracturing the shear pin and forcing the retaining means holding said closure plate in a port closed position, away from said closure plate, whereby the closure plate is freed to move out of the auxiliary port whenever the pressure inside the rocket motor housing is greater than the pressure outside the rocket motor housing.

2. A rocket motor, said rocket motor comprising a housing, said housing having at least one auxiliary port formed therein, an adapter ring mounted in said auxiliary port, said adapter ring having an inwardly directed flange defining a shoulder portion, a closure plate mounted in said adapter ring and bearing against said inwardly directed flange, a mounting stud mounted on said closure plate and extending axially therefrom, an initiator housing fitting over said mounting stud, a shear pin extending through aligned openings in said initiator housing and said mounting stud, a retaining ring mounted in said auxiliray port, at least one retaining finger bearing against said closure plate, one end of said retaining finger being pivotally mounted on said initiator housing, the opposite end of said retaining finger bearing against the retaining ring, means for generating a high gas pressure in said initiator housing to break the shear pin whereby the initiator housing is forced off of said mounting stud, causing said retaining finger to pivot until said opposite end clears the retaining ring, whereby the initiator housing and the retaining finger move away from said closure plate and can move out of the auxiliary port whenever the pressure inside the rocket motor housing is greater than the pressure outside the rocket motor housing.

3. A rocket motor, said rocket motor comprising a housing, said housing being provided with at least one auxiliary port formed therein, said port being provided with a counterbore, an adapter ring mounted in said counterbore, with one end bearing against the base of said counterbore, a retaining ring mounted in said auxiliary port, the opposite end of said adapter ring bearing against the retainer ring whereby said adapter ring is held in a fixed position in said auxiliary port, the inner end of said adapter ring being provided with an inwardly directed flange defining a shoulder portion, a closure plate, said closure plate being mounted in said auxiliary port with one side of said closure plate bearing against the inwardly directed flange on said adapter ring, said closure plate being provided with a threaded recess disposed centrally thereon, a mounting stud threadably received by said threaded recess, a tubular initiator housing mounted over said mounting stud, a shear pin extending through aligned bores in said initiator housing and said mounting stud, the free end of the tubular initiator housing being provided with a threaded bore, an externally threaded bolt threadably received by the threaded bore of the initiator housing for defining a sealed chamber therebetween, said bolt being provided with an opening, a gas generator mounted in said opening and communicating with said sealed chamber, said initiator housing being provided with an outwardly extending flange portion, a retaining finger, one end of said retaining finger being pivotally mounted on said flange portion, the opposite end of said retaining finger bearing against said retaining ring, said closure plate being formed with an abutment portion bearing against said retaining finger to prevent the retaining finger from pivoting in one direction, whereby when said gas generator is fired, the gas pressure inside the sealed chamber is high enough to fracture the shear pin, whereupon the resulting gas pressure forces the initiator housing off the mounting stud and causes the retaining finger to pivot until said opposite end clears the retaining ring, whereby the initiator housing and retaining finger move away from the closure plate, so that the closure plate is free to move out of the auxiliary port whenever the pressure inside the rocket motor housing is greater than the pressure outside the rocket motor housing.

References Cited
UNITED STATES PATENTS

| | | | |
|---|---|---|---|
| 2,515,049 | 7/1950 | Lauritsen et al. | 102—49 X |
| 2,775,201 | 12/1956 | Conway | 102—49 |
| 2,850,976 | 9/1958 | Seifert | 102—49 |
| 2,928,346 | 3/1960 | Grimes | 102—49 X |
| 3,052,091 | 9/1962 | D'Ooge | 102—49 |

CARLTON R. CROYLE, *Primary Examiner.*

SAMEUL FEINBERG, *Examiner.*

G. H. GLANAZMAN, *Assistant Examiner.*